United States Patent [19]

Gibbs

[11] Patent Number: 5,016,746
[45] Date of Patent: May 21, 1991

[54] CONVEYOR BELT SCRAPING APPARATUS

[75] Inventor: A. Todd Gibbs, Allentown, Pa.

[73] Assignee: ASGCO Manufacturing, Inc., Allentown, Pa.

[21] Appl. No.: 483,959

[22] Filed: Feb. 9, 1990

Related U.S. Application Data

[63] Continuation of Ser. No. 209,457, Jun. 20, 1988, abandoned.

[51] Int. Cl.$^5$ .............................................. B65G 45/16
[52] U.S. Cl. .................................... 198/499; 198/497; 15/256.51
[58] Field of Search .............................. 198/497, 499; 15/256.51

[56] References Cited

U.S. PATENT DOCUMENTS

| | | |
|---|---|---|
| 3,504,786 | 4/1970 | Matson . |
| 3,598,231 | 8/1971 | Matson . |
| 3,631,968 | 1/1972 | Ward . |
| 3,674,131 | 7/1972 | Matson ............................ 198/497 X |
| 3,841,470 | 10/1974 | Meguro . |
| 3,952,863 | 4/1976 | Schattauer . |
| 4,053,045 | 10/1977 | Reiter ............................... 198/499 |
| 4,098,394 | 7/1978 | Stahura . |
| 4,249,650 | 10/1981 | Stahura . |
| 4,354,425 | 10/1982 | Childress et al. . |
| 4,359,150 | 11/1982 | Bowman et al. . |
| 4,489,823 | 12/1984 | Gordon . |
| 4,533,035 | 8/1985 | Reiter ............................... 198/499 |
| 4,533,036 | 8/1985 | Gordon . |
| 4,633,999 | 1/1987 | Pernecsky . |
| 4,662,507 | 5/1987 | Veehof . |
| 4,768,644 | 9/1988 | Cromm ............................. 198/499 |

FOREIGN PATENT DOCUMENTS 0254977 2/1988 European Pat. Off. ............ 198/499
8705585 9/1987 World Int. Prop. O. .......... 198/499

OTHER PUBLICATIONS

Conveyors Components Co. Bulletin No. C-400 (1983).
Engineered Systems for Conveyor Belt Cleaning and Sealing.
Brochure entitled "Lovejoy Designers Handbook".
ASGCO Brochure (1983).
Brochure entitled "New Trelleborg Belt Cleaners".

*Primary Examiner*—Robert P. Olszewski
*Assistant Examiner*—James R. Bidwell
*Attorney, Agent, or Firm*—Dann, Dorfman, Herrell and Skillman

[57] ABSTRACT

An apparatus for scraping conveyor belts having a plurality of resilient scraping blades dependent on each other for lateral support and pivotal stability, but capable of individually flexing away from the belt surface. Each blade is positioned in side-by-side abutting relation across the width of the conveyor belt, and sufficiently thick to prevent blade twisting or turning by providing mutual support for the abutting blade or blades. The blades extend into angled engagement with the belt to shave debris from the belt surface. Each blade is mounted on a single trailing arm which is disposed within a tensioning blade support element to allow independent flexing of the blades away from but not towards the belt surface. The support elements are set in a longitudinal array and mounted for rotation on a shaft positioned transversely and in spaced relation to the belt surface.

12 Claims, 3 Drawing Sheets

CONVEYOR BELT SCRAPING APPARATUS

RELATED APPLICATION

The present application is a continuation of U.S. application Ser. No. 209,457, filed June 20, 1988, now abandoned.

1. Field of the Invention

The present invention is directed to a scraping apparatus for use in cleaning the surface of endless conveyor belts.

BACKGROUND OF THE INVENTION

2. Description of the Prior Art

It is common practice in the conveyor art to provide scrapers for conveyor belts. Generally these scrapers are provided on the underside of the belt to scrape debris from the belt surface just after the belt starts its return flight after rounding a head pulley. An apparatus typical of that design is disclosed in U.S. Pat. No. 3,598,231.That patent further discloses the common practice of staggering or offsetting the scraping blades along the width of the belt in an attempt to prevent debris from jamming and/or freezing between adjacent scraping blades. Typically, these offset blades are made of metal or at least contain a sharpened metal edge. That design allows for ready adjustment of individual blades but causes significant problems under high load pressure.

Other prior art designs utilize scraping blades arranged at an angle to the belt which plow or hoe debris off to one side. That type of arrangement is disclosed in U.S. Pat. No. 3,504,786. Plowing arrangements, as well as staggered arrangements, attempt to remove debris quickly, thus effecting better cleaning while eliminating buildup and/or freezing between adjacent scraping blades. Both of those arrangements typically scrape debris from the belt at approximately a 90° angle in relation to the belt surface. With the 90° design the blades must be staggered, because, if all blades were positioned next to one another, debris would bunch up quickly and render the scraping apparatus inoperative and/or ineffective.

Staggered blade arrangements are not without their own problems, however. With a staggered blade arrangement, an unequal tension may be imparted to the belt surface and, effectively, there could be more tension on one blade than on another. Also with that arrangement, one may be forced to change blades under dangerous field conditions by requiring a workman to crawl or reach into a conveyor chute while using tools to change the blades. This is illustrated in U.S. Pat. No. 4,249,650, where nuts have to be loosened and tightened every time a blade has to be changed or adjusted.

A further problem with staggering and/or plowing, and particularly with metal blades, is that under high load pressure the blades may twist or turn sideways, thereby bending the support arm, loosening the bolt attaching the arm and blade, misaligning the belt, and/or tearing the belt surface. Blade twisting or turning which causes belt tearing can destroy thousands of feet of belt, which can be quite costly to replace.

In the past, scraping blades have only been between about ⅛ inch to ½ inch thick. For example, U.S. Pat. No. 4,533,036 discloses a plurality of thin scraping blades mounted on single or multi-armed resilient supports. That patent shows the blades to be arranged side-by-side, with the intermediate blades supported by only a single arm. However, such an arrangement does not suggest that the individual thin blades can be positioned in side-by-side abutting relation to prevent blade twisting by providing mutual lateral support and pivotal stability. In fact, that patent discloses outer blades mounted on two supporting arms to achieve greater structural rigidity. That patent further discloses supporting arms containing resilient couplings for providing shock absorbency at the expense of possible blade twisting or turning. Although that patent discloses shaving of the belt surface, as opposed to plowing, it does not address the problem of blade twisting nor does it provide a solution for eliminating its occurrence.

The tensioning of most prior art belt scrapers against the belt surface has been accomplished by an external tensioning system. Examples include counterweight designs, ratchet tensioners, air cylinders, torsion arms and air bags. Although effective, these systems are cumbersome and require a lot of space for installation and maintenance. Additionally, dangerous conditions may result if the scraping apparatus gets caught by the belt while a person is making adjustments or standing nearby. This condition could cause a lever arm or counterweight to rotate or move unexpectedly, causing bodily harm. Since the arm of the scraper is often secured to a rotatable transverse support shaft either through a spring or elastomeric biasing mechanism, each arm and blade is also made rotatable. Therefore, if the conveyor belt were to suddenly reverse its direction of movement, (i.e. due to an inclined conveyor or a malfunctioning pulley brake) belt pressure could cause the blades and support arms to rotate or be torqued backwards thus breaking or bending the entire scraping apparatus. The blades could end up at various angles to the belt surface. Thus, once the belt is restarted and made to travel in its intended direction, the damaged arms and blades could flip back to their original positions thereby cutting or tearing the belt surface.

The novel apparatus of the present invention overcomes the foregoing deficiencies of prior art scrapers by providing an apparatus which shaves the surface of conveyor belts in angled engagement to remove debris that has built up on the belt surface. The present invention accomplishes this result in a manner which minimizes damage to the belt surface and danger to those standing nearby. Accordingly, it is an object of the present invention to provide an apparatus for scraping conveyor belts which does not have the inherent deficiencies of the prior art.

Other objects and advantages of the present invention will become apparent to those skilled in the art with reference to the attached drawings and the description of the invention which hereinafter follows.

SUMMARY OF THE INVENTION

The present invention provides a conveyor belt scraping apparatus for removing debris from the surface of conveyor belts and the like. The apparatus comprises a support member in spaced relation to the belt surface. The apparatus has a plurality of tensioning blade support means mounted on the support member in a longitudinal array extending across the belt width. A plurality of resilient scraping blades are singularly mounted on the individual tensioning blade support means and positioned in side-by-side abutting relation across the belt width. Each blade is of sufficient thickness to prevent blade twisting or turning by providing lateral support for the abutting blade or blades. Thus, the blades are mutually dependent on each other for lateral support and pivotal stability but capable of individually flexing away from the belt surface. Each blade extends into engagement with the surface of the belt.

In one embodiment, the invention is a belt scraping apparatus comprising a rotatable shaft positioned transversely of a conveyor belt in close spaced relation to the belt surface. A plurality of elastomeric tensioning elements are individually secured within a blade support housing and mounted onto the shaft in a longitudinal array extending across the belt width. The tensioning elements are capable of rotating downward within the support housing to adjust for deformities in the belt surface, but are kept from rotating upward by a means for preventing rotation towards the belt surface. The housing and tensioning element are mounted on the shaft for rotation therewith. A plurality of trailing arms are individually mounted in each tensioning element and extend to an anchor plate. A plurality of resilient elastomeric scraping blades are attached to the anchor plate in a tongue and groove arrangement and secured by a snap-lock pin. The blades are positioned in side-by-side abutting relation across the belt width and are of sufficient thickness to prevent blade twisting or turning by mutually providing lateral support and pivotal stability. Each blade extends into angled engagement with the surface of the belt.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE PREFERRED EMBODIMENT

Figure 1:
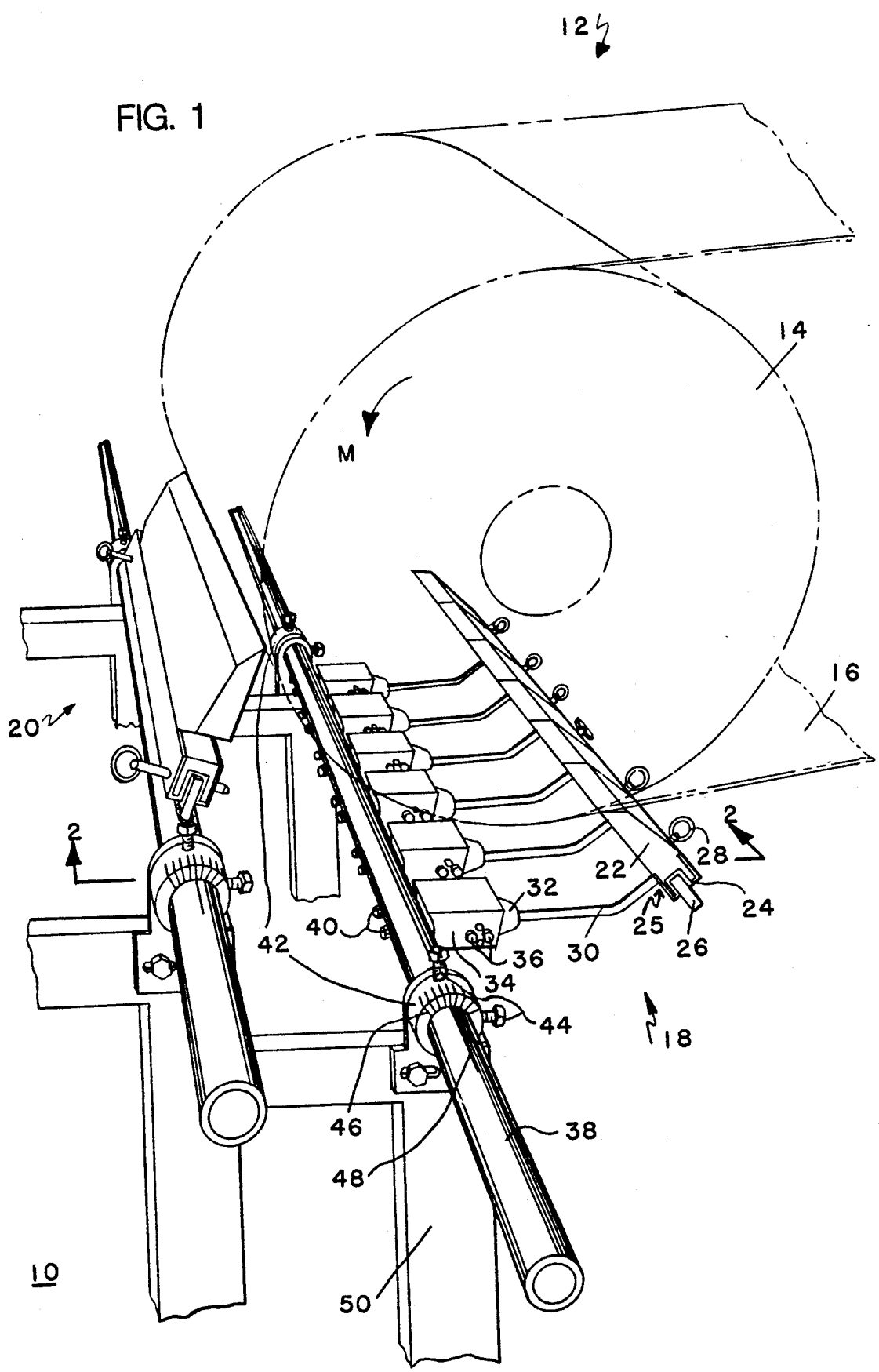
FIG. 1 is a perspective view of a conveyor belt scraping apparatus constructed in accordance with one embodiment of the present invention, as installed on the head pulley of a belt conveyor and working in conjunction with a one bladed conveyor belt precleaning apparatus.

Referring now to the drawings, wherein like numerals indicate like elements, there is shown in FIG. 1 a conveyor belt cleaning system 10 in conjunction with a conveyor belt apparatus 12. The conveyor belt apparatus 12 (not a part of this invention) is shown in phantom in FIG. 1 and comprises a head pulley 14 and a conveyor belt 16 both traveling in direction M. The conveyor belt cleaning system 10 comprises a conveyor belt scraping apparatus 18 according to the invention and a conveyor belt precleaning apparatus 20 known in the prior art.

Figure 2:
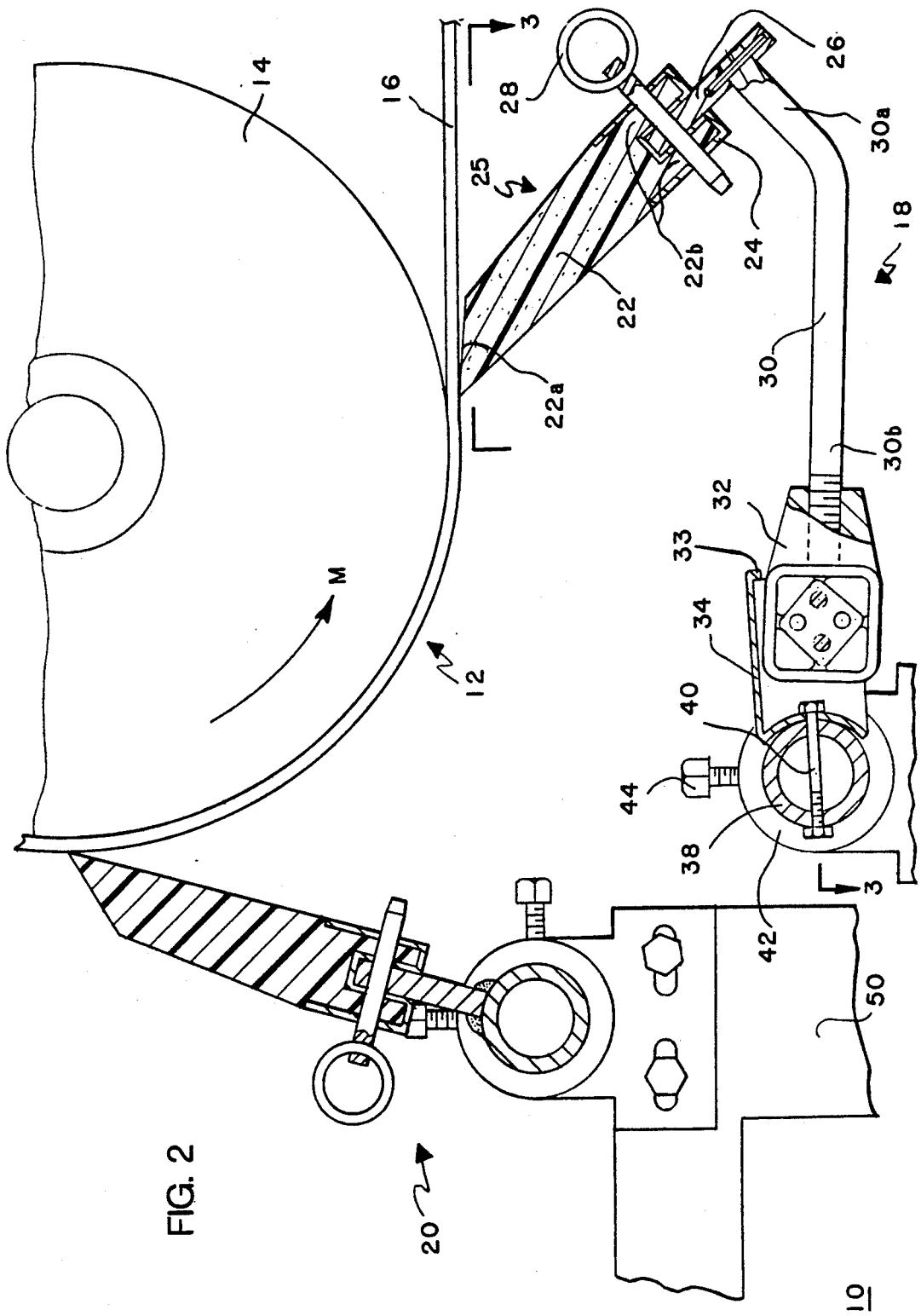
FIG. 2 is a cross-sectional view taken along lines 2—2 of FIG. 1 illustrating the conveyor belt scraping apparatus and precleaning apparatus in engagement with the belt surface.

The scraping apparatus 18 comprises a plurality of resilient elastomeric scraping blades 22 in angled engagement with the conveyor belt 16. The blades 22 are preferably set at an angle of 45° and constructed of polymeric material, although the precise angle or material are not critical to the invention. The blades 22 are positioned in side-by-side abutting relation across the belt 16, and are sufficiently thick to prevent blade twisting or turning by providing lateral support and pivotal stability for the abutting blade or blades. As illustrated in FIG. 2, the thickness of the blade body, up to the blade edge 22a, prevents the blade 22 from twisting or turning about its support.

Blade 22 is set in an extruded base 24 for providing rigid attachment with an anchor plate 26. The base 24 is preferably made of extruded metal, although the precise material or manner of its manufacture are not critical to the invention. Base 24 has side walls and an interior web which define channels between the side walls and web for receiving legs 22b of the blade 22. This arrangement insures snug, positive fit of blade 22 into extrusion 24. Resilient blade 22 and extruded base 24 together make up a blade assembly 25. Assembly 25 contains a hole positioned midway across the blade width which extends through base 24 and the blade legs 22b.

The exterior surface of the web on base 24, opposite the blade 22, defines a channel or groove sized to fit over anchor plate 26 so that the blade assembly 25 can be readily and positively placed on anchor plate 26. Base 24 and anchor plate 26 act as a tongue and groove assembly thereby allowing quick replacement of worn blades 22. Assembly 25 is secured to anchor plate 26 by a removable snap-lock pin 28, running though the hole across the thickness of the blade, and through a corresponding hole in anchor plate 26.

Blade assembly 25 is preferably defined by the following exemplary dimensions. The assembly is 7 to 9 inches in length, 6 inches in width, and 1-¾ inches thick across the extruded base 24. The exterior web of base 24 extends 1-5/16 inches inward away from the end of the receiving legs 22b of blade 22. The assembly hole is 17/64 inches in diameter and positioned midway across the assembly width and ¾ inches from the bottom of the channel defined by the exterior web of extruded base 24.

A single trailing arm 30 is attached perpendicularly on anchor plate 26 and extends outwardly into a tensioning element 32. Trailing arm 30 is made up of an angle arm section 30a, which defines the angle of engagement of blade 22 with belt 16, and straight arm section 30b. Tensioning element 32 allows blade 22 to flex downward and away from deformities in the surface of belt 16. The straight arm section 30b is attached into the tensioning element 32 which is in turn mounted in a blade support housing 34 by a pair of housing mounting bolts 36 to provide a resilient connection affording rotation of the arm about a horizontal axis through the tensioning element 32.

Tensioning element 32 is preferably made of a molded elastomeric rubber material. As shown in FIG. 2, the tensioning element 32 allows blade 22 to instantly flex away from deformities in the surface of belt 16, yet, because of its elastic qualities, permits the blade to return to its original position once the deformity has passed. While tensioning element 32 is permitted to rotate downward within the support housing 34, a lip 33, protruding from the edge of the upper surface of support housing 34, prevents tensioning element 32 from rotating upward towards the belt surface. Therefore blade 22, while in angled engagement with the belt surface 16, can only move down and away from the belt surface and not up and into the belt. Thus, if the direction of belt movement were to suddenly reverse, blade 22 could not be forced backwards in an injurious torquing manner.

Figure 3:
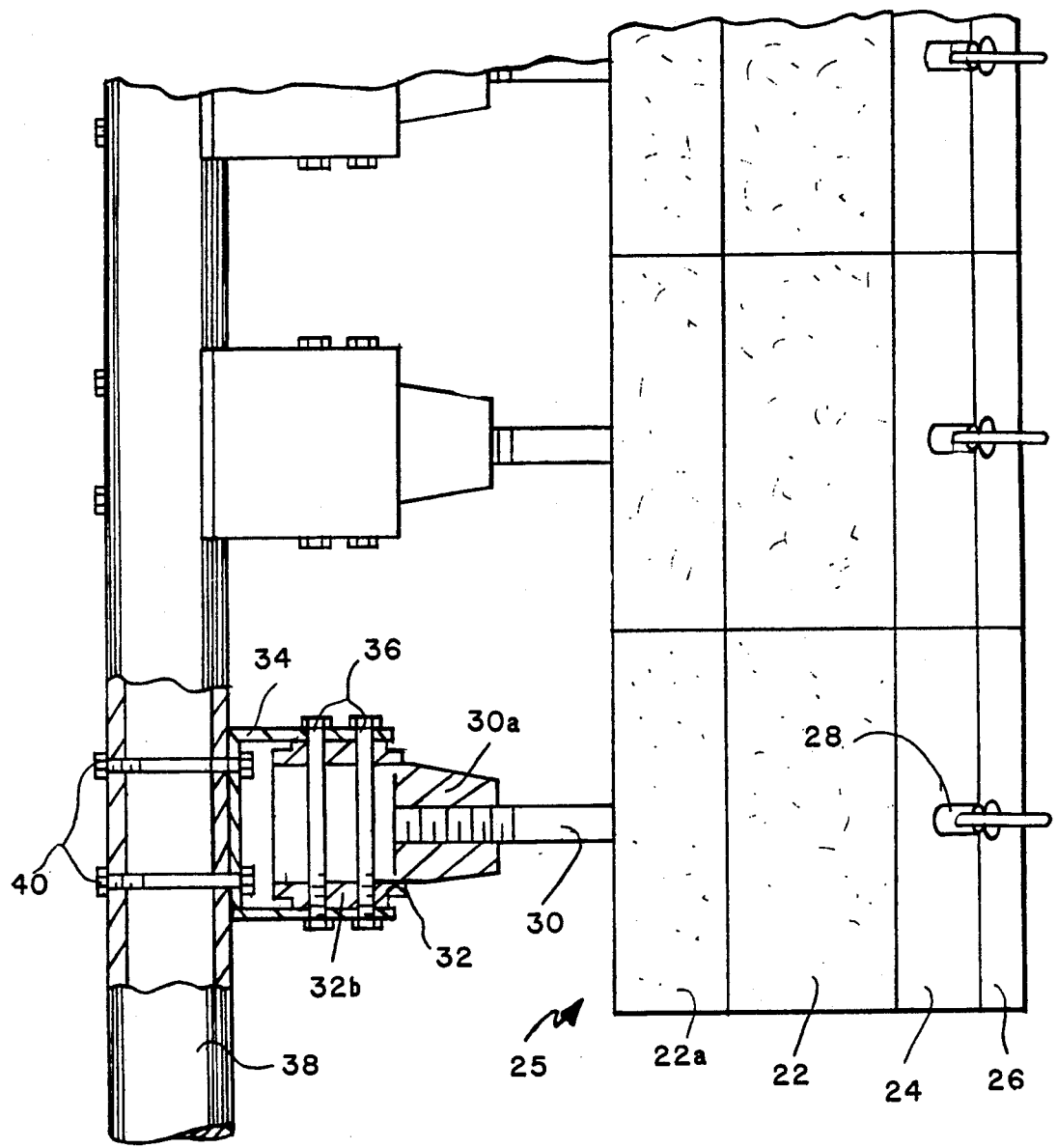
FIG. 3 is a partial top view of the conveyor belt scraping apparatus taken along lines 3—3 of FIG. 2, also illustrating a cross-sectional view of one elastomeric tensioning element in accordance with one embodiment of the present invention.

As more fully illustrated in FIG. 3, tensioning element 32 comprises a nose piece 32a and a mounting piece 32b. Mounting piece 32b is secured within blade support housing 34 by a pair of housing mounting bolts 36. Nose piece 32a, containing trailing arm 30, protrudes from blade support housing 34 and is clearly shown in FIG. 1. An example of a commercially available tensioning element constructed of molded rubber is manufactured by the LoveJoy Company and identified as Part No. 100158-Type ST 27.

Housing 34 is fixedly mounted on a rotatable shaft 38 by a pair of bolts 40. The shaft is positioned transversely of the conveyor belt 16 in spaced parallel relation to the scraping edge 22a forward of the blades relative to the direction of movement of the belt 16. The shaft is journaled for rotation in a pair of locking collars 42 at opposite ends of the shaft. The collars 42 are mounted on a support frame 50 which appears in FIGS. 1 and 2. The shaft 38 can be rotated to increase or decrease the tension in the tension element 32 and thereby the bias of the blade 22 on the conveyor belt 16. Counterclockwise rotation increases the bias and clockwise rotation decreases the bias until the blade is rotated away from belt 16. Shaft 38 is held in place after adjustment by set screws 44 in collar 42. Index marks 46 are provided on collar 42. Reference line 48 is marked on shaft 38 for providing visual reference for the tension in the element 32 or the bias of the blade 22 against belt 16.

The conveyor belt precleaning apparatus 20 (not a part of this invention) shown in FIGS. 1 and 2, comprises a single scraping blade in angled engagement with the conveyor belt 16. The precleaner 20 acts as a primary belt cleaner and is positioned to make contact with the conveyor belt 16 roughly along the horizontal center line of head pulley 14.

Figure 4:
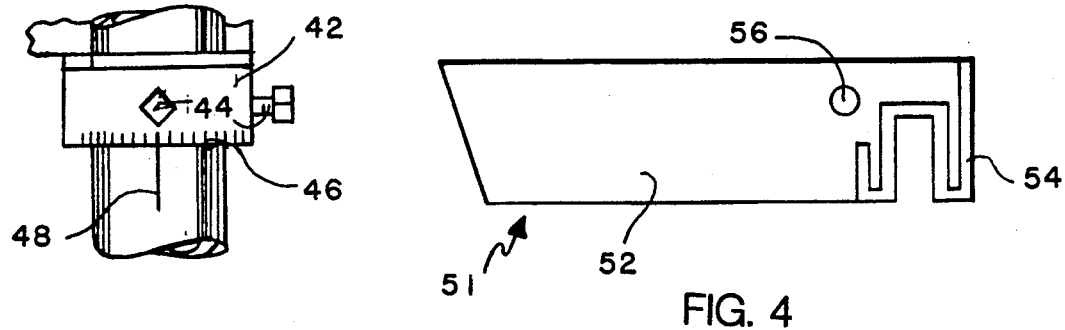
FIG. 4 is a side view of a scraping blade assembly constructed in accordance with one embodiment of the present invention illustrating a scraping blade set in an extruded base.

Referring now to FIG. 4, there is shown a side view of another embodiment of the scraping blade assembly 51 containing scraping blade 52, extruded base 54, and pin hole 56. Blade 52 is set in extruded base 54 for providing snug attachment with an anchor plate 26 as previously illustrated in FIG. 2. In this embodiment, the channel defined by the exterior surface of the web on extruded base 54 is positioned at the blade base and perpendicular to the axis of blade length. Thus, the channel or groove of base 54 runs along the thickness of blade 52. This embodiment allows blade 52 to scrape conveyor belt 16 in dragging relation to the direction of belt movement M. Instead of being at the preferred angle of 45°, blade 52 would scrape the conveyor belt 16 at a 135° angle.

It can now be seen how this invention solves the problems of blade twisting and debris buildup upon the scraping apparatus structure inherent in the prior art. The thickness of the resilient scraping blades positioned in side-by-side abutting relationship prevents blade twisting or turning in the resilient connection provided by the tension element 32 by providing lateral support and pivotal stability for each neighboring blade. The thickness of the blade along the full lengths of its side edges where it abuts adjacent blades supports the blade and the adjacent blades against twisting. The sliding engagement with the adjacent blades guides the scraping edge 22a of the blade for movement parallel to the belt in response to irregularities in the conveyor belt, or to debris carried by the conveyor belt. Blade thickness further permits a single trailing arm to be used for each blade, thus minimizing the opportunity for debris to build up and/or freeze upon the scraping apparatus structure.

The present invention may be embodied in other specific forms without departing from the spirit or essential attributes thereof and, accordingly, reference should be made to the appended claims, rather than the foregoing specifications, as indicating the scope of the invention.

I claim:

1. Apparatus for cleaning a conveyor belt by shaving debris therefrom, said apparatus comprising:

a plurality of elastomeric scrapers blades positioned in side by side relation in a common plane with side edges of said blades abutting, each of said blades having a scraping edge extending from one of its side edges to the other, said scraping edges being normally aligned so as to form a continuous shaving edge for transverse engagement with a moving conveyor belt, each blade being inclined at an angle directed against the conveyor belt, a rotatable shaft positioned transversely of the belt in spaced parallel relation to the aligned scraping edges forward of said aligned scraping edges relative to the direction of movement of the conveyor belt, an individual blade support means for each blade supporting the blade for movement toward and away from the conveyor belt with its scraping edge parallel to the normal alignment of said scraping edges comprising a trailing arm connected at one end to the associated blade and at the other end to said shaft, at least one of said connections being resilient to bias said scraping edge of the blade for said parallel movement toward the conveyor belt and limiting displacement of the blades out of said common plane, each blade having sufficient thickness and length along the length of its side edges where it abuts an adjacent blade to support itself and the adjacent blade against twisting in their resilient connections whereby said support means and the abutting side edges of adjacent blades cooperate to provide lateral support to prevent twisting of the blade in said resilient connection in response to irregularities in the conveyor belt or the debris carried by the conveyor belt, and a frame having a collar surrounding said shaft for mounting said shaft for rotation whereby rotation of said shaft adjusts the bias applied by the resilient connection tending to displace the blade towards the conveyor belt, and index means comprising index marks spaced circumferentially about said collar, and a reference line on said shaft operable to register with index marks to provide a visual indication of the rotary position of said shaft in said frame and thereby a reference for the bias of the blade against the belt.

2. Apparatus according to claim 1 wherein said resilient connection comprises a housing mounted on said shaft and a resilient tensioning element supporting said arm for pivotal movement toward and away from the conveyor belt, said housing having a lip protruding into the path of pivotal movement of said resilient tensioning means to limit pivotal movement of said arm toward the conveyor belt.

3. Apparatus for providing secondary cleaning of a conveyor belt by shaving debris therefrom, said apparatus being adapted to be positioned downstream in close proximity to a primary conveyor belt scraper, said apparatus comprising:
   a plurality of elastomeric scraper blades positioned in abutting co-planar side by side relation so as to form a continuous shaving edge for transverse engagement with a conveyor belt, each blade being inclined at an angle directed against the direction of movement of the conveyor belt,
   each blade having sufficient dimensional thickness over its side edges where it abuts an adjacent blade to mutually support itself and an adjacent blade against twisting, and
   blade support means for each blade comprising:
      an elongated trailing arm, a housing and a resilient tensioning element mounted in said housing and resiliently supporting said arm for pivoting movement only toward and away from said conveyor belt, said housing including means to limit the degree of movement of the arm in the direction toward the conveyor belt,
      each trailing arm being fixed at one end to a blade and at the other end to one of said resilient tensioning elements,
      said support means including means to adjustably position the edge of each of said blades in transverse engagement with a conveyor belt,
      the dimensional thickness of the side edges of each individual blade where it contacts an adjacent blade providing lateral support to prevent the blade from twisting out of its co-planar abutting relationship with adjacent blades in response to irregularities in the belt structure or the debris carried by the belt.

4. Apparatus in accordance with claim 3 wherein the means for limiting pivotal movement of the arm is a lip protruding from the surface of the housing nearest to the conveyor belt and engaging said tensioning element when said element is at the limit of its resilient displacement.

5. An apparatus according to claim 3 in which the scraper blade is of molded polymeric material.

6. An apparatus according to claim 3 in which the scraper blade is at least 1-¾ inches thick along its side edges and is approximately 6 inches in width, said trailing arm being longer than the width of said blade.

7. An apparatus according to claim 3 in which the scraper blade extends into 45° angled engagement with the belt surface.

8. An apparatus according to claim 3 wherein:
   (a) said scraper blade has an extruded base; and
   (b) said trailing arm has an anchor plate mounted at said one end operable to engage said extruded base to attached said blade to said arm.

9. An apparatus according to claim 8 in which the trailing arm extends from said resilient tensioning element substantially parallel to the conveyor belt and terminates in an upwardly bent portion mounting said anchor plate.

10. Apparatus in accordance with claim 3 wherein each scraper blade is supported by only one arm.

11. Apparatus for cleaning a conveyor belt by scraping the debris therefrom, said apparatus comprising:
   a plurality of elastomeric scraper blades positioned in side by side relation in a common plane with side edges abutting one another along their length, each of said blades having a shaving edge extending from one of its side edges to the other, said shaving edges being normally aligned so as to form a continuous shaving edge for transverse engagement with a moving conveyor belt, each blade having sufficient length and thickness along its side edges to mutually support itself and an adjacent blade against twisting their shaving edges out of said alignment,
   individual blade support means for each blade comprising a resilient support element and an elongated arm mounting said blade at one end and fixed in said resilient support element at the other end,
   a common supporting member carrying said resilient support elements for adjustably positioning the resilient support element to bias the shaving edge of each blade into engagement with the conveyor belt,
   each of said resilient support elements enabling the shaving edge of its associated blade to move toward and away from the conveyor belt in parallel relationship to said normal alignment of said shaving edges, the length and thickness of the side edges providing lateral support so that the blade and arm does not twist in said resilient support element in response to irregularities in the belt and debris carried by the conveyor belt and
   a stop lip for each said resilient support element cooperable with said common supporting member for limiting the movement of its associated blade toward the conveyor belt.

12. Apparatus in accordance with claim 11 wherein each scraper blade is supported by only one arm.

* * * * *